US011251866B2

(12) United States Patent
Bongaarts et al.

(10) Patent No.: US 11,251,866 B2
(45) Date of Patent: Feb. 15, 2022

(54) WIRELESS DELIVERY OF BROADCAST DATA (71) Applicant: T-Mobile USA, Inc., Bellevue, WA (US)

(72) Inventors: Paul Bongaarts, Issaquah, WA (US); Cameron Byrne, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 76 days.

(21) Appl. No.: 16/700,521

(22) Filed: Dec. 2, 2019

(65) Prior Publication Data
US 2020/0112369 A1 Apr. 9, 2020

Related U.S. Application Data (63) Continuation of application No. 15/799,505, filed on Oct. 31, 2017, now Pat. No. 10,498,442.
(Continued)

(51) Int. Cl.
*H04L 12/28* (2006.01)
*H04B 10/112* (2013.01)
(Continued)

(52) U.S. Cl.
CPC ........ *H04B 10/1129* (2013.01); *H04L 12/189* (2013.01); *H04L 29/06455* (2013.01);
(Continued)

(58) Field of Classification Search
CPC ............. H04L 12/189; H04L 29/06455; H04L 65/4076; H04L 65/80; H04L 29/06462;
(Continued)

(56) References Cited

U.S. PATENT DOCUMENTS 5,801,938 A * 9/1998 Kalantery ............... G06F 30/20
700/2
7,330,693 B1 * 2/2008 Goss ....................... H04H 20/59
455/3.01
(Continued)

FOREIGN PATENT DOCUMENTS

| CN | 1819609 A | 8/2006 |
| EP | 3148151 | 3/2017 |
| KR | 20050098199 A | 10/2005 |

OTHER PUBLICATIONS

Final Office Action dated Jan. 15, 2019 for U.S. Appl. No. 15/828,297 "Wireless Delivery of Broadcast Data" Bongaarts, 17 pages.
(Continued)

*Primary Examiner* — Stephen M D Agosta
(74) *Attorney, Agent, or Firm* — Lee & Hayes, P.C.

(57) ABSTRACT

Systems and methods for improved content streaming and downloading. The system enables content to be transmitted to wireless base stations (WBSs) using unicast on the core network side of a cellular network to avoid incompatibilities associated with network broadcast technologies such as Evolved Multimedia Broadcast Multicast Services (eM-BMS) and Long-Term Evolution Broadcast (LTE-B). At the same time, the system enable content to be broadcast, or transmitted to multiple user equipment (UE) in a single transmission to reduce wireless bandwidth consumption. The system can include a commodity server to receive requests from WBSs, place them in a chronological list based on network latency, and then transmit content to each WBS in a synchronized unicast manner. Each WBS can then transmit the content to a plurality of UEs with minimal buffer required due to the "pre-synchronization."

20 Claims, 7 Drawing Sheets

Related U.S. Application Data (60) Provisional application No. 62/541,588, filed on Aug. 4, 2017.

(51) Int. Cl.

| | | |
|---|---|---|
| *H04L 12/18* | (2006.01) | |
| *H04L 29/06* | (2006.01) | |
| *H04W 72/00* | (2009.01) | |
| *H04W 84/04* | (2009.01) | |
| *H04W 88/08* | (2009.01) | |

(52) U.S. Cl.
CPC .......... *H04L 65/4076* (2013.01); *H04L 65/80* (2013.01); *H04W 72/005* (2013.01); *H04L 29/06462* (2013.01); *H04W 84/042* (2013.01); *H04W 88/08* (2013.01)

(58) Field of Classification Search
CPC ............ H04B 10/1129; H04W 72/005; H04W 84/042; H04W 88/08
See application file for complete search history.

(56) References Cited

U.S. PATENT DOCUMENTS

| | | | | |
|---|---|---|---|---|
| 7,486,680 | B1* | 2/2009 | Zhang | H04N 21/23406 |
| | | | | 370/395.4 |
| 8,270,324 | B2 | 9/2012 | Li et al. | |
| 8,897,437 | B1* | 11/2014 | Tan | H04M 3/5175 |
| | | | | 379/265.07 |
| 8,898,317 | B1* | 11/2014 | Armstrong | H04L 65/1069 |
| | | | | 709/228 |
| 9,049,406 | B2* | 6/2015 | Meek | H04N 21/4622 |
| 9,237,324 | B2* | 1/2016 | Lee | H04L 65/605 |
| 9,491,398 | B1* | 11/2016 | Hou | H04N 7/0127 |
| 2002/0112247 | A1* | 8/2002 | Horner | H04N 21/854 |
| | | | | 725/112 |
| 2004/0008657 | A1 | 1/2004 | Lee et al. | |
| 2004/0225728 | A1* | 11/2004 | Huggins | H04L 29/06 |
| | | | | 709/223 |
| 2005/0036512 | A1* | 2/2005 | Loukianov | H04J 3/0685 |
| | | | | 370/469 |
| 2005/0114537 | A1* | 5/2005 | Griswold | H04L 12/1827 |
| | | | | 709/231 |
| 2005/0125453 | A1* | 6/2005 | Rozack | H04L 67/02 |
| 2006/0140186 | A1* | 6/2006 | LoGalbo | H04L 1/1887 |
| | | | | 370/390 |
| 2007/0047516 | A1* | 3/2007 | Kottilingal | H04L 65/1083 |
| | | | | 370/352 |
| 2007/0064684 | A1* | 3/2007 | Kottilingal | H04L 65/1006 |
| | | | | 370/355 |
| 2007/0153801 | A1* | 7/2007 | Sung | H04L 47/823 |
| | | | | 370/395.4 |
| 2007/0224997 | A1 | 9/2007 | Florkey et al. | |
| 2007/0274296 | A1* | 11/2007 | Cross, Jr. | G10L 15/222 |
| | | | | 370/356 |
| 2008/0152030 | A1* | 6/2008 | Abramov | H04B 7/0871 |
| | | | | 375/260 |
| 2009/0258659 | A1 | 10/2009 | Kim et al. | |
| 2009/0300174 | A1 | 12/2009 | Floris et al. | |
| 2010/0076968 | A1 | 3/2010 | Boyns et al. | |
| 2011/0063440 | A1 | 3/2011 | Neustaedter et al. | |
| 2011/0296006 | A1 | 12/2011 | Krishnaswamy et al. | |
| 2011/0310810 | A1* | 12/2011 | Kenington | H04W 88/085 |
| | | | | 370/329 |
| 2013/0088569 | A1* | 4/2013 | Fredericks | H04N 13/194 |
| | | | | 348/43 |
| 2013/0311408 | A1 | 11/2013 | Bagga et al. | |
| 2014/0226594 | A1 | 8/2014 | Liu | |
| 2014/0342712 | A1 | 11/2014 | Madhavan et al. | |
| 2014/0375883 | A1 | 12/2014 | Meek et al. | |
| 2015/0003234 | A1 | 1/2015 | Samardzija et al. | |
| 2015/0067715 | A1* | 3/2015 | Koat | H04H 60/15 |
| | | | | 725/25 |
| 2015/0271234 | A1* | 9/2015 | O'Malley | H04N 21/8456 |
| | | | | 709/219 |
| 2016/0135016 | A1 | 5/2016 | Zou | |
| 2016/0142783 | A1 | 5/2016 | Bagga et al. | |
| 2016/0283585 | A1 | 9/2016 | Zheng | |
| 2017/0070549 | A1 | 3/2017 | Kotecha et al. | |
| 2017/0149855 | A1 | 5/2017 | Doshi et al. | |
| 2019/0045249 | A1 | 2/2019 | Bongaarts et al. | |
| 2019/0132047 | A1 | 5/2019 | Bongaarts et al. | |

OTHER PUBLICATIONS

Office Action for U.S. Appl. No. 15/828,297, dated Apr. 25, 2019, Bongaarts, "Wireless Delivery of Broadcast Data", 15 pages.

Office Action for U.S. Appl. No. 15/799,505, dated May 17, 2019, Bongaarts, "Wireless Delivery of Broadcast Data", 11 pages.

Office Action for U.S. Appl. No. 15/828,297, dated Aug. 1, 2018, Paul Bongaarts, "Wireless Delivery of Broadcast Data", 15 pages.

Final Office Action dated Aug. 23, 2019 for U.S. Appl. No. 15/828,297, "Wireless Delivery of Broadcast Data" Bongaarts, 17 pages.

PCT Search Report and Written Opinion dated Oct. 26, 2016 for PCT Application No. PCT/US2018/041508 , 9 pages.

PCT Search Report and Written Opinion dated Oct. 29, 2018 for PCT Application No. PCT/US18/42842, 9 pages.

Zhu et al, "Virtual Base Station Pool: Towards A Wireless Network Cloud for Radio Access Networks", retreived at <<https://dl.acm.org/citation.cfm?id=2016646>>, ACM International Conference on Computing Frontiers, May 2011, pp. 1-3.

Extended European Search Report dated Oct. 28, 2020 for European Patent Application No. 18841635.8, a counterpart foreign application of U.S. Pat. No. 10,498,442, 8 pages.

Chinese Office Action dated Jul. 5, 2021 for Chinese Application No. 201880050652.2, a foreign counterpart to U.S. Pat. No. 10,498,442, 6 pages.

Extended European Search Report dated Apr. 9, 2021 for European Patent Application No. 18842404.8, 8 pages.

* cited by examiner

WIRELESS DELIVERY OF BROADCAST DATA

RELATED APPLICATIONS

This application is a continuation of and claims priority to U.S. patent application Ser. No. 15/799,505, filed Oct. 31, 2017, titled "WIRELESS DELIVERY OF BROADCAST DATA," which claims priority to U.S. Provisional Patent Application No. 62/541,588, filed Aug. 4, 2017, titled "Wireless Delivery of Broadcast Data," the entirety of both which are incorporated herein by reference.

BACKGROUND

Data can be sent wirelessly to multiple users in a variety of ways. The data can be sent unicast, or "end-to-end," in which data is sent by a provider (e.g., a digital content provider on the Internet) and routed through the Internet, cellular core network, and directly to the end user. When multiple users request the same data from the same cell site at substantially the same time or request a live stream, however, the data can be sent by the provider, through the Internet, cellular core network, and broadcast to multiple users at the same time. In other words, though the data is being sent to multiple users, it need only be transmitted once by a particular cell site.

Wireless broadcast is an efficient method to deliver data to multiple users, compared with sending unicast to each member individually. Technologies such as Evolved Multimedia Broadcast Multicast Services (eMBMS) and Long-Term Evolution Broadcast (LTE-B) have leveraged internet protocol (IP) multicast in the transport network to quickly replicate data packets from a content provider server towards the cell site, or wireless base station (WBS)—e.g., eNodeB.

To enable the data from the content provider to be sent to multiple cell sites, the data is first replicated by the network. Moving replication from the origin server to the network leverages efficiencies in the network, but only if that network efficiently supports IP multicast. Due to the complexity and variability in the modern cellular core network, however, supporting IP multicast in the network can be problematic.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure can comprise systems and methods for providing IP broadcast services over a variety of cellular networks. The system maintains network simplicity, while moving complexity associated with IP broadcast into a dedicated component—e.g., a commodity server, clouds of servers, application specific integrated circuit (ASIC), or field programmable gate arrays (FPGAs) on the server (collectively, "commodity servers")—to do more complex tasks such as data replication and time synchronization.

As mentioned above, for a variety of reasons, many portions of the cellular core network do not efficiently support broadcast services. Meanwhile, wired network communications (e.g., fiber optic, cable, and other wired connections) on the Internet and within the core network provide essentially limitless capacity. Due to the proliferation of wireless communications devices, however, wireless, and particularly cellular, bandwidth is at a premium. To this end, examples of the present disclosure can modify portions of current core network IP multicast mechanisms in concert with other technologies such as Multimedia Broadcast Multicast Services (eMBMS), Long-Term Evolution Broadcast (LTE-B), and similar data distribution technologies to provide highly scalable, quasi-synchronous, unicast distribution of data to wireless base-stations, or "cell sites." Content can then be efficiently broadcast from cell sites to users in a single transmission, reducing wireless bandwidth requirements. A combination of software advances and leveraging ASICs and FGPAs on commodity servers can bring near synchronous replication and distribution of unicast data to a wide set (10s, 100s, 1,000s, etc.) of wireless base stations (WBSs).

Figure 1:
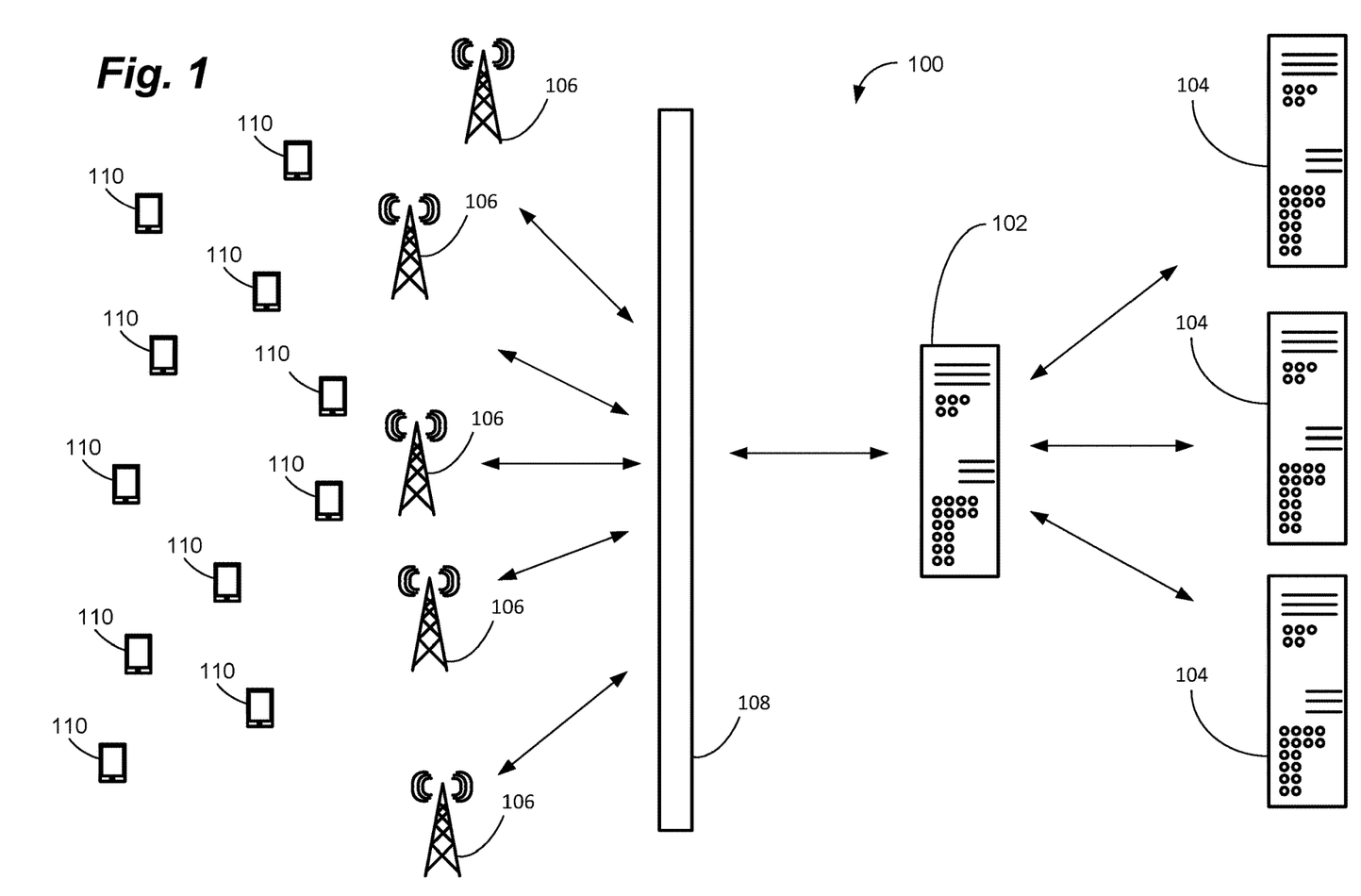
FIG. 1 depicts an example of a commodity server for providing content a plurality of user equipment (UEs) connected to a cellular core network, in accordance with some examples of the present disclosure.

As shown in FIG. 1, examples of the present disclosure can comprise a system 100 for providing content to WBSs using unicast on the core network side to avoid incompatibilities and broadcast on the wireless side to reduce bandwidth consumption. As mentioned above, the wired portion of the cellular network, or core network, has essentially unlimited bandwidth. High-speed cable, fiber optic, and other connections can provide incredible bandwidth (or, throughput); and, while they are not literally unlimited, transmissions speeds on the order of terabytes per second are possible. As a result, examples of the present disclosure can use unicast transmission over the core network to avoid broadcast compatibility issues, while using broadcast transmission from the WBSs to the users' equipment (UEs) to reduce wireless bandwidth consumption.

To this end, the system 100 can comprise one or more commodity servers 102 configured to receive content from content servers 104. The commodity server 102 can comprise a single server or one or more clouds of servers, ASICs, FPGAs, tablet computers, laptops, or other electronic devices. As discussed below, the commodity server 102 can shift some, or all, of the replication and synchronization steps from the core network 108 to the commodities server 102.

The content servers 104 can comprise servers, clouds of servers, or other computational devices used to stream live broadcasts, podcasts, streaming content, and other internet data. The content servers 104 can comprise third party content servers such as, for example, You Tube, TV streaming sites (e.g., Hulu), podcasts, and other third party content. The content servers 104 can also comprise components of the core network 108 configured to download content from third-party servers to make the content available "inside" the core network 108.

As used herein, the core network 108 can comprise the "back-end" of the cellular communications network. Thus, the core network 108 can include multiple servers, routers, and other components such as, for example, Third Generation Partnership Program Authentication, Authorization and Accounting (3GPP AAA), proxy-call session control function (P-CSCF), interrogating-call session control function (I-CSCF), etc. Thus, the core network 108 is responsible for routing calls from one user equipment (UE) 110 to another UE, from the Internet to UEs 110, etc. The core network 108 is also responsible for roaming, billing, and other functions needed for the cellular network to function.

The UEs 110 can comprise a variety of electronic devices capable of one or more types of wireless communication (e.g., cellular, Wi-Fi, Bluetooth®, etc.). The UEs 110 can comprise, for example, cell phones, smart phones, tablet computers, laptops, desktops, smart watches, and other electronic devices. In this case, the UEs 110 can enable users to stream video and/or audio content from various content providers via the content servers 104.

Conventionally, content would be downloaded from a content server 104 to components on the core network 108, replicated by one or more components of the core network 108, and then distributed to multiple WBSs 106 (i.e., using IP multicast). This configuration was initially implemented due to the performance limitations of servers at the time, particularly the content servers 104, which dictated that the replication be performed on multiple, powerful computers within the core network 108. This configuration removed the burden from the content servers 104, for example, but placed the burden on the core network 108.

As technology has shifted, however, core network 108 bandwidth (e.g., wired internet bandwidth) has increased, while processing load on the core network 108 has also increased. Thus, components of the core network 108 tend to be overloaded, while bandwidth across the core network 108 is somewhat underutilized. To this end, shifting some of the processing burden off of the core network 108, while utilizing excess network bandwidth can be beneficial. As mentioned above, due advances in software, ASICs, FGPAs, and other features now available on the commodity server 102, the commodity server 102 can now perform near synchronous replication and distribution of unicast data to a wide set (10s, 100s, 1,000s, etc.) of WBSs 106. Thus, the commodity server 102 can receive the data from a content provider and can also be configured with, or can discover, a set of WBSs requesting to receive the broadcast.

Based on this set of WBSs 106, the commodity server 102 and the set of WBSs 106 exchange capabilities and willingness to join in the broadcast flow. Thus, each WBS 106 can provide an IP address to the commodity server 102, for example. The WBSs 106 may also provide performance requirements (e.g., bandwidth limits, file formats, etc.) to enable the commodity server 102 to send the appropriate content. Thus, WBSs 106 with limited bandwidth capabilities due to technical limitations, high traffic, or poor conditions may receive lower resolution video, for example, and vice-versa.

The commodity server 102 compiles a list of WBSs 106 receiving the unicast packets. The list can include various specifications for each of the WBSs 106 including, for example, the distance from the commodity server 102 to the WBS 106, any network induced latency, bandwidth restraints, etc. Thus, the delivery and time alignment of the unicast packets can be optimized by the commodity server 102.

The commodity server 102 can be responsible for replicating the data packets for unicast to each WBS 106. This shifts the burden from the core network 108 to the dedicated commodity server 102. In addition, the commodity server 102 can be responsible for synchronization, such that each WBS 106 receives each respective packet of data at substantially the same time. Thus, the commodity server 102 can send data packets to WBSs 106 that are farther away and/or have higher network latencies first, and vice-versa. Thus, while some buffer may be involved to account for unknown or variable factors (e.g., changing network loads), the amount of buffer required is minimized by the commodities server 102, further freeing up network resources.

Upon receipt of the data packet, the WBSs 106 can then broadcast the data packet to each user equipment (UE) 110 using a broadcast algorithm. In some examples, the broadcast algorithm can again synchronize the transmission to a timestamp in the packet, for example, or based on a timestamp provided by the previous packet. This can enable content to be broadcast "live", but with some minimal delay, or to enable content to be broadcast sequentially (e.g., part 1 of the content, followed by part 2, etc.). Because the packet has been sent "pre-synchronized" by the commodity server 102, however, buffer time in the broadcast algorithm can be significantly reduced. In other words, by synchronizing the broadcast at two stages—by the commodity server 102 and by the broadcast algorithm at the WBSs 106—buffer time at the WBSs 106 is reduced, or eliminated. This further shifts precious resources (e.g., buffer) from the network to the commodities server 102.

The commodity server 102 or the WBS 106 can trigger an end to the broadcast and/or being removed from the set of WBSs 106 receiving the broadcast. Thus, the commodity server 102 can send each successive data packet in the same manner until all data has been sent (e.g., a simulcast ends) or until a WBS 106 requests to be removed from the list. This may be because there are no longer any users connected to the WBS 106 requesting that particular broadcast (e.g., all users have dropped off or have moved to another WBS 106).

Thus, the system 100 moves replication and synchronization burden off of the core network 108 and onto the commodities server 102. Yet, because the data is nonetheless sent unicast to each of the WBSs 106, the system 100 reduces deployment barriers (e.g., supporting IP multicast) associated with Third Generation Partnership Project (3GPP) defined eMBMS or LTE-B broadcast techniques. As mentioned above, the burden on relatively scarce computing resources on the core network 108 are reduced, while relatively plentiful bandwidth is utilized. In addition, multiple synchronization stages smooth unicast delivery of synchronized content and reduce buffer.

Figure 2A:
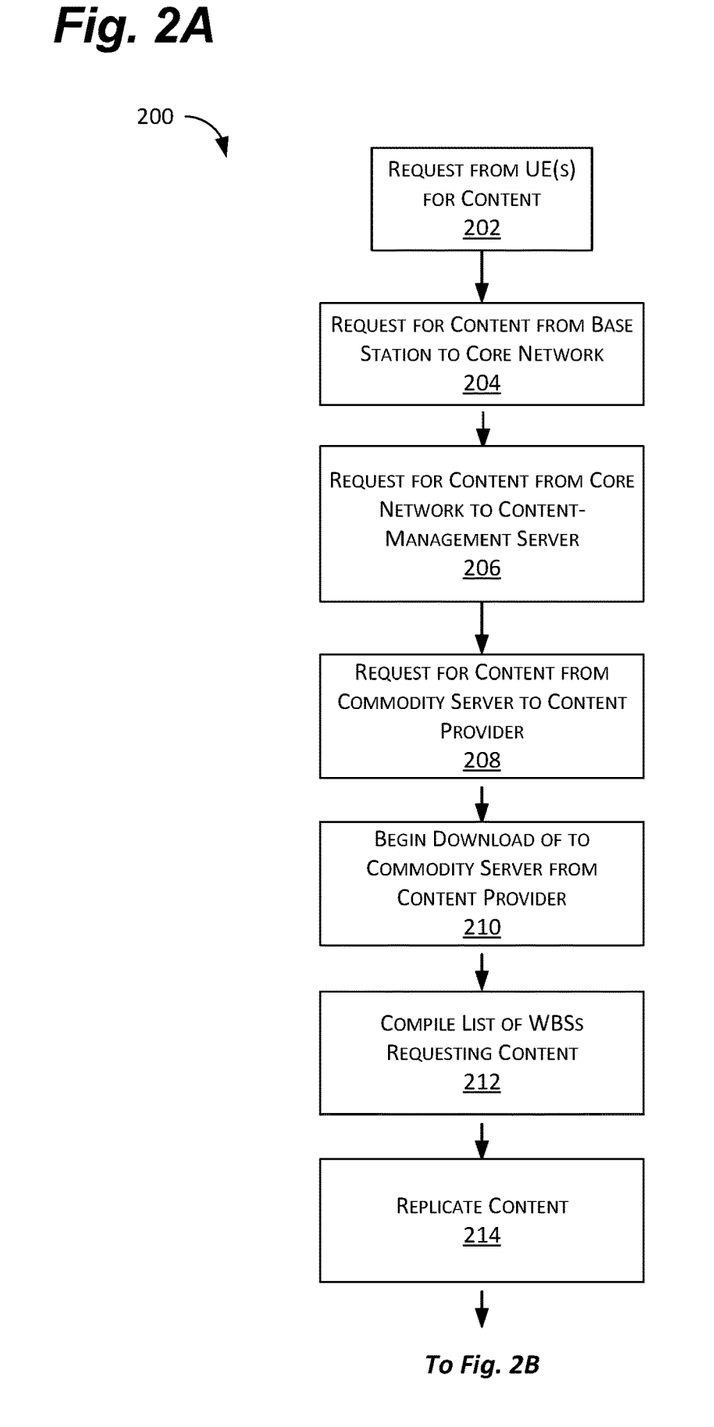
FIGS. 2A and 2B are flowcharts depicting an example of a method for sending content over the core network using traditional unicast transmission, but broadcasting the content from wireless base stations (WBSs) to the UEs, in accordance with some examples of the present disclosure.
Figure 2B:
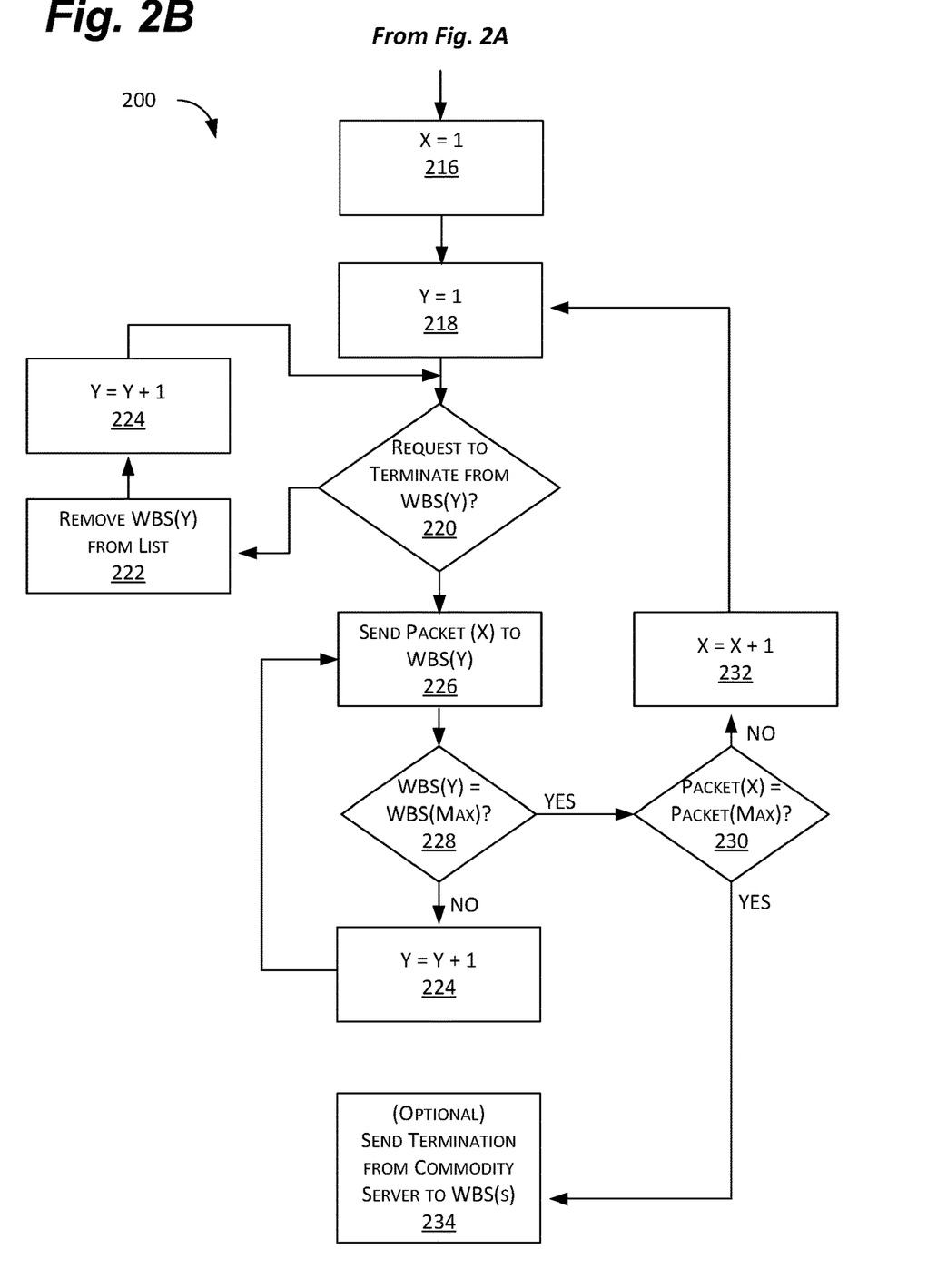

As shown in FIG. 2, examples of the present disclosure can also comprise a method 200 for providing content to WBSs using unicast on the core network side to avoid incompatibilities and broadcast on the wireless side to reduce bandwidth consumption. As mentioned above, the method 200 can shift processing duties off of relatively high loaded core network 108 components and onto dedicated commodity servers 102. The method 200 can also avoid compatibility issues caused by eMBMS or LTE-B broadcast techniques, because network-side communications utilize conventional unicast technologies. Yet, broadcasting can be used from WBSs 106 to content requesters—users requesting content via UEs 110—to maximize wireless bandwidth.

At 202, therefore, the method 200 can begin with a plurality of UEs 110 requesting content from a content server 104 via one or more WBSs 106. Obviously, if only one UE 110 is requesting content from a particular WBS 106, then that UE 110 can be served using tradition end-to-end unicast transmission—i.e., no bandwidth savings are realized by broadcasting to a single UE 110. Each WBS 106 from which more than one UE 110 has requested the same content, on the other hand, can benefit from broadcasting the content once to multiple UE 110.

At 204, the WBS 204 can send the request for content to the core network 108. The request can include, for example, an IP address, website, or other relevant information for the applicable content server 104 and similar information regarding the WBS 106. The request can also include information regarding the content requested. The content can comprise, for example, live streaming for a particular channel, a podcast, or a simulcast of a sporting event, among other things. In some examples, the request can simply comprise a hyperlink or a SIP message with the relevant information for the content and the WBS 106.

At 206, rather than requesting the content directly from the content server 104, the core network 108 can request the content from the commodity server 102. Indeed, in some examples, the core network 108 may simply pass the message along from the WBS 106 to the commodity server 102. As mentioned above, in this manner, the burden of replicating and routing the content to the plurality of WBSs 106 is shifted off of the core network 108 and onto the commodity server 102.

At 208, the commodity server 102 can request the content from the content server 104. In this configuration, however, rather than replicating the content at the content server 104, only a single copy of the content needs to be downloaded to the commodity server 102. The content may be downloaded as a complete file, packet-by-packet, or in any manner deemed suitable. Thus, the burden of replicating and routing the content to the plurality of WBSs 106 is shifted from the content server 104 to the commodity server 102.

At 210, the commodity server 102 can begin the download of the content from the content server 104. In many cases, such as when then content is live streaming, the content can be downloaded to the commodity server 102 in packets, for example, or individual portions of files, that are downloaded in near real-time—i.e., as quickly as allowable based on network and content server 104 latency, etc. The individual files can be independently playable, for example, and can be provided to the UEs 110 such that no interruption in the content is perceived by the user.

At 212, the commodity server 102 can compile a list of WBSs 106 from which the same content has been requested. The list can be ordered by the commodity server 102 such that the list is ordered based on the distance, network latency, and other factors related to the time required to send data to each WBS 106. So, the closest WBS 106 with the lowest latency, for example, would be last on the list, and vice-versa. In this manner, all WBSs 106 on the list can receive the content at substantially the same time. And, while the commodity server 102 may introduce some buffer to account for unknown variables in transmission, the buffer is minimized by the ordering of the list.

At 214, the commodity server 102 can replicate the content based on the number of WBSs 106 on the list. In some examples, the commodity server 102 can also replicate the content some number of "extra" times to account for WBSs 106 that join the broadcast in the interim. As mentioned above, replicating the content on the commodity server 102 shifts this burden off of the content server 104 and onto the dedicated commodity server 102.

As shown in FIG. 2B, at 216, the commodity server 102 can begin the process of sending each packet, at the appropriate time, to each WBS 106. The method 200 can begin by setting a first counter, X, associated with the current packet number to 1. At 218, a second counter, Y, associated with the current WBS 106 to 1. Thus, the method 200 can first send packet(1) to WBS(1) 106, for example. As discussed above, WBS(1) 106 is the first WBS 106 on the aforementioned list, and is actually the WBS 106 that is the "farthest" time-wise from the commodity server 102—i.e., the travel time (distance multiplied by propagation speed) combined with any network latency between the commodity server 102 and WBS(1) 106 is the greatest.

At 220, prior to sending packet(1) to WBS(1) 106, the commodity server 102 can determine if, in the interim, WBS(1) 106 has requested to be removed from the list. This may be because, in the interim, all, or all but one, of the UEs 110 requesting the content from UBS(1) 106 have canceled their request. This may be because the users simply decided not to watch the content, the user moved from WBS(1) 106 to another WBS 106 (i.e., they are moving), the UEs 110 disconnected from WBS(1) 106, or some other reason. Revising the list prior to sending packet(1), however, can prevent unnecessary data from being sent over the network, reducing bandwidth consumption.

At 222, if, for any reason, there are no longer any UEs 110 connected to UBS(1) 106, the method 200 can remove WBS(1) 160 from the list prior to sending the data packet. In some examples, if there is only one UE 110 connected to WBS(1) that is requesting the content, WBS(1) can also be removed from the list, as no wireless bandwidth savings are provided by broadcasting to a single UE 110. On the other hand, from a routing standpoint and based on the other efficiencies of the system 100 (e.g., performing replication on the commodity server 102), the method 200 can nonetheless leave UBS(1) 106 on the list.

At 224, if UBS(1) is removed from the list, the method 200 can increment Y by one to move to the next WBS 106 subscribed to the content, in this case WBS(2) and the method 200 can continue iteratively at 220.

At 226, if WBS(1) 160 has not requested to be removed from the list, on the other hand, the method 200 can send packet(1) to WBS(1) 106. As mentioned above, in some examples, packet(1) may literally be a packet of data that forms part of the stream for the requested content. In other examples, the packet can be a complete file that represents a portion of the content. So, for example, a video simulcast may be split into multiple video files (e.g., .avi, .mov, .mpeg, etc.), each of which are separately playable. These files can then be downloaded to the UEs 110 and can be played in chronological order providing substantially seamless playback.

At 228, regardless of the form of the data, the method 200 can then determine if the current WBS(1) 160 is the "last" WBS 160 on the list, or if WBS(1)=WBS(Max). This ensures that packet(1) is sent to all WBSs 106 on the lost prior to moving on to packet(2). In this case, assuming more than one WBS 106 is subscribed to the content, then WBS(1) 106 is not the last WBS 106 on the list, and the method 200 continues.

At 224, since WBS(1) 106 is not the last WBS 106 on the list (i.e., WBS(1) WBS(Max)), Y is incremented by one. This enables the system 100 to send packet(1) to, in this case, WBS(2) 106. In this manner, packet(1) is sent sequentially to each WBS 106 in the list from WBS(1) to WBS (Max) and from the WBS 106 that is "farthest" from the commodity server 102 to the WBS 106 that is closest.

At 230, if WBS(1) 106 is the last WBS 106 on the list (i.e., WBS(1)=WBS(Max)), then the method 200 next checks to see if all packets for the content have been sent; or, in this case, if packet(1)=packet(Max). Assuming that there is more than one data packet, then packet(1) is not the last packet on the list (i.e., packet(1) packet(max)), and the method 200 continues iteratively until all packets have been sent to all WBSs 106.

At 232, therefore, X is incremented by 1 to begin the process for sending packet(2), in this case, to all of the subscribed WBSs 106. At 218, the method 200 continues iteratively by setting Y back to 1. This enables the system 100 to send packet(2) to UBS(1) 106 continuing the process of sending packet(2) to all of the subscribed WBSs 106. As mentioned above, during each iteration, the system 100 can determine if a particular WBS 106 is still subscribed and remove those that are not.

At 230, at some point, all packets will have been sent to all WBSs 106 (i.e., packet(X)=packet(Max) and WBS(Y) =WBS(Max)). At 234, therefore, the commodity server 102 can optionally send a termination message to the WBSs 106. Obviously, reaching the "end" of the content could signify the end of a live simulcast, for example, the end of a podcast, or some other event. In some examples, the "end" could also signify that all WBSs 106 have unsubscribed from that particular content. Regardless, the commodity server 102 can send a separate message terminating the broadcast, include the termination in the last packet (i.e., packet(Max)), or simply stop transmitting. In the latter case, the connections between the commodity server 102, core network 108, and WBSs 106 may terminate automatically after a predetermined amount of time, obviating the need for a termination message.

As mentioned above, at least a portion of the efficiency of the system 100 can be attributed to improved synchronization. In other words, conventionally, content is sent somewhat randomly from the content server 104 through the core network 108 to the WBSs 106 and time synchronization (whether absolute or relative to the content) is left solely to the WBSs 106. This results in increased processing load on the WBSs 106 and increased buffer times.

Figure 3:
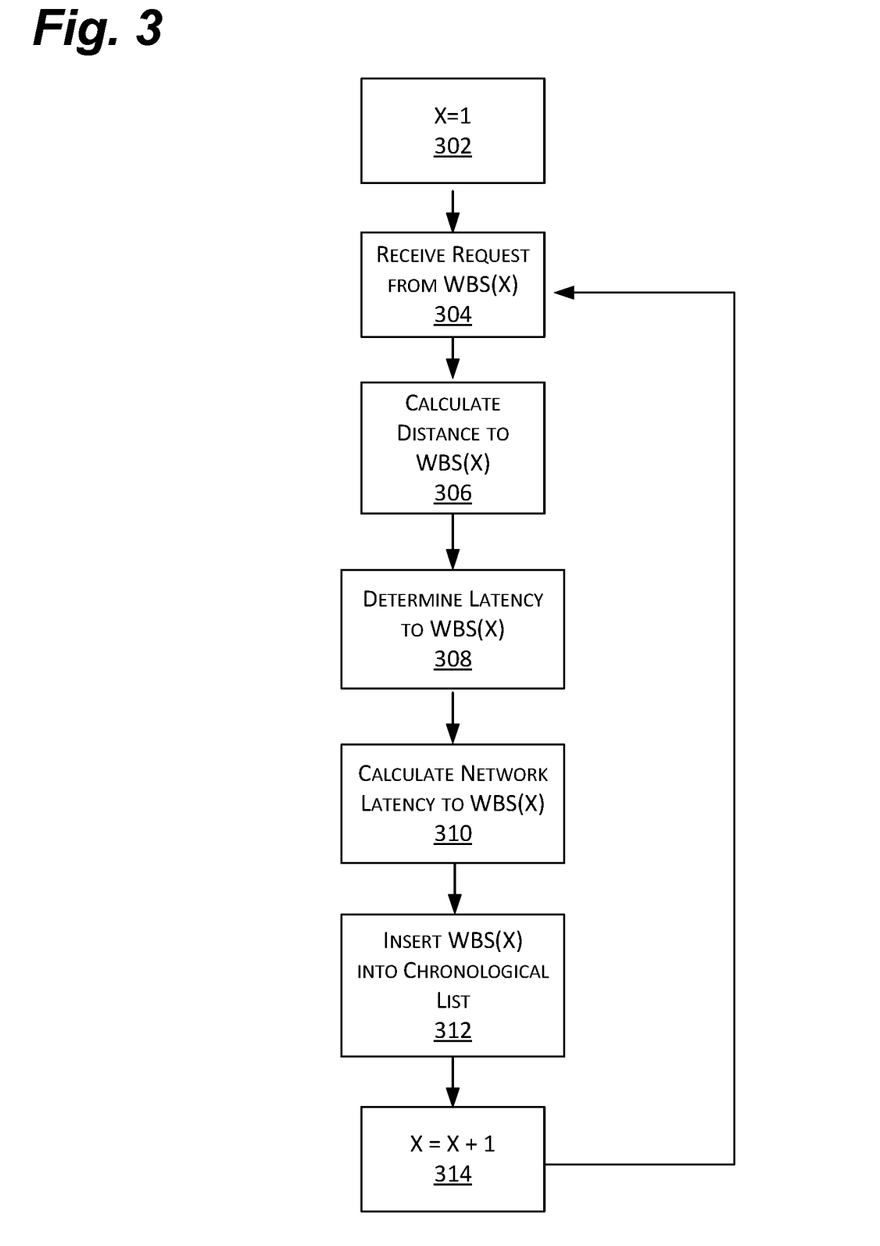
FIG. 3 is a flowchart depicting an example of a method for placing the UEs in chronological order according to descending network latency, in accordance with some examples of the present disclosure.

As shown in FIG. 3, therefore, examples of the present disclosure can also comprise a method 300 to synchronize the content at the commodity server 102 with a chronological list of WBSs 106 prior to transmitting the content. In this manner, while some synchronization may still be required by the WBSs 106, processing demands and overall buffer (e.g., buffer at the commodity server 102+buffer at the WBSs 106) is reduced. In other words, since the network latency—i.e., the total transmission latency for a particular WBS 106, including distance from the commodity server 102, errors, switching time, and other network delays—for each WBS 106 is accounted for in the transmission, each WBS 106 receives the packet at substantially the same time.

This also enables the time between when the packet is received and when the packet is to be played, or buffer time, to be reduced.

As shown in FIG. 3, therefore, as the commodity server 102 receives each request from each WBS 106 for the same content, the WBS 106 can be added to the list in chronological order, with the WBS 106 with the highest network latency first on the list and vice-versa. At 302, to this end, the counter for the request, X, can be set to 1—i.e., the first request received is request(1).

Example 1

At 304, the commodity server 102 can receive a request for content from a WBS(X) 106, in this case WBS(1) 106, or the first WBS 106 to request the content. As mentioned above, therefore, the only significance to WBS(1) 106 is that it was the first WBS 106 to request the content. As discussed below, it will nonetheless be placed in the appropriate location in the chronological list based on its network latency.

At 306, the commodity server 102 can calculate the distance from the commodity server 102 to WBS(1) 106. This may be included in the request from WBS(1) 106, for example, or may be provided in a lookup table accessible to the commodity server 102. At 308, the commodity server 102 may also calculate the latency to WBS(1) 160. The latency can be caused by switching, errors, jitter, and other factors in the core network 108. Again, this can be provided in the request or may be provided in a lookup table accessible to the commodity server 102. At 310, the commodity server can combine the delay caused simply by the travel time to WBS(1) 160 and the latency caused by other factors in the core network 108 to calculate the total latency, or network latency for WBS(1) 160. Indeed, in some examples, the commodity server 102 can combine steps 308 and 310 and can determine the total network latency (time to travel+ latency) based on the request itself. In other words, based on when the request was sent and received (as provided in the timestamp of the request), the commodity server 102 can determine the network latency for WBS(1) 106. In some examples, the commodity server 102 can also periodically "ping" each WBS 106 on the list to determine network latency.

At 312, regardless of how the network latency is determined, the method 300 can continue by inserting the current request (from WBS(1) 106) chronologically in the list. In other words, requests with lower latency (less time) go lower on the list, and vice-versa. In this case, since this is the first request, WBS(1) 106 is both the first request in the list and the last, because WBS(1) 106 is the only request this far. The sorting process can be executed by the commodity server 102 using bubble sorting or another suitable sorting algorithm known in the art.

At 314, X is incremented by one and the method 300 continues with the next request, in this case a request from WBS(2) 106.

Example 2

| Chronological List | Requested Order (WBS(X)) | Network Latency (ms) |
|---|---|---|
| 1 | WBS(3) | 45 ms |
| 2 | WBS(2) | 35 ms |

| Chronological List | Requested Order (WBS(X)) | Network Latency (ms) |
|---|---|---|
| 3 | WBS(4) | 25 ms |
| 4 | WBS(1) | 10 ms |

As shown above, in this example, there are already four entries in the chronological list, which have been reordered from their original request order (X)—i.e., the order in which they were received—into a chronological list. At this point, X=5 (the next request to come in will be the fifth request). At 304, therefore, a new request comes in to the commodity server 102 from WBS(5) 106. In this example, we will assume that WBS(5) has a network latency of 30 ms. Skipping ahead to 310, therefore, regardless of how it was determined, Latency(5)=30 ms.

At 312, Latency(5)—30 ms—is compared to Latency(1) in the chronological list—45 ms—and is found to be less than Latency(1), compared to Latency(2), etc., and is ultimately inserted third in the chronological list. Of course, at the same time, the current third and fourth entries in the chronological list are moved down one slot:

| Chronological List | Requested Order (WBS(X)) | Network Latency (ms) |
|---|---|---|
| 1 | WBS(3) | 45 ms |
| 2 | WBS(2) | 35 ms |
| 3 | WBS(5) | 30 ms |
| 4 | WBS(4) | 25 ms |
| 5 | WBS(1) | 10 ms |

At 314, X is again incremented by one to await the next request, in this case from WBS(6).

Figure 4:
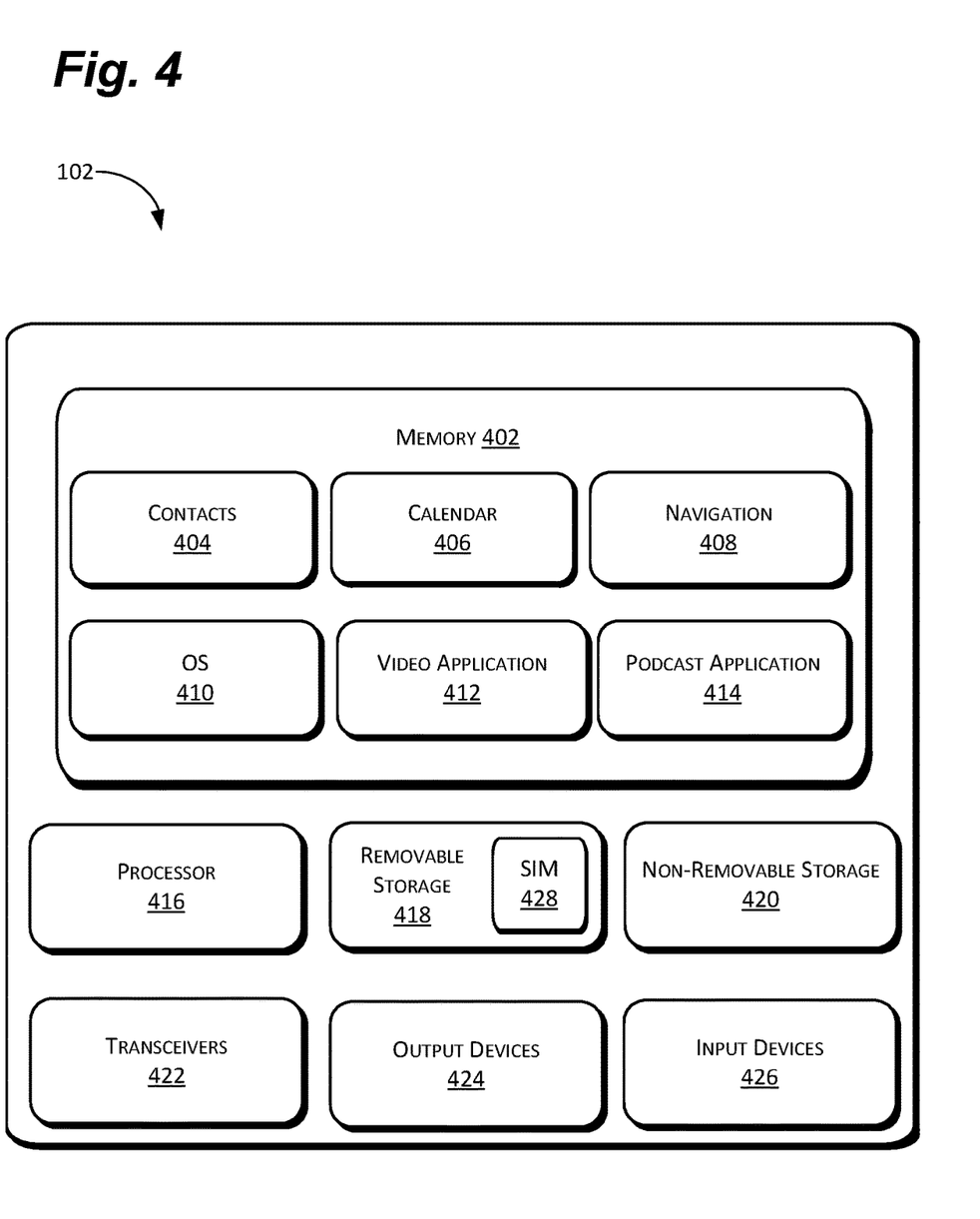
FIG. 4 is an example of a UE for use with the systems and methods disclosed herein, in accordance with some examples of the present disclosure.

As shown in FIG. 4, the system 100 and methods 200, 300 can be used in conjunction with a UE 110 that can comprise a variety of electronic devices. For clarity, the UE 110 is described herein generally as a cell phone or smart phone. One of skill in the art will recognize, however, that the system 100 and methods 200, 300 can also be used with a variety of other electronic devices, such as, for example, tablet computers, laptops, desktops, and other network (e.g., cellular or IP network) connected devices from which audio, video, and other content can be consumed. These devices are referred to collectively as UEs 110.

The UEs 110 can comprise a number of components to execute the above-mentioned functions. As discussed below, the UEs 110 can comprise memory 402 including many common features such as, for example, the contacts 404, calendar 406, navigation software 408, and the operating system (OS) 410. In this case, the memory 402 can also include, for example, one or more video applications 412 (e.g., You Tube or Hulu) and a podcast application 414 (e.g., Overcast or Pod Wrangler).

The UEs 110 can also comprise one or more processors 416. In some implementations, the processor(s) 416 can be a central processing unit (CPU), a graphics processing unit (GPU), or both CPU and GPU, or any other sort of processing unit. The UEs 110 can also include one or more of removable storage 418, non-removable storage 420, transceiver(s) 422, output device(s) 424, and input device(s) 426. In some examples, such as for cellular communication devices, the UEs 110 can also include a subscriber identification module (SIM) 428 including an International Mobile Subscriber Identity (IMSI), and other relevant information.

In various implementations, the memory 402 can be volatile (such as random access memory (RAM)), non-volatile (such as read only memory (ROM), flash memory, etc.), or some combination of the two. The memory 402 can include all, or part, of the functions 404, 406, 408, 412, 414 and the OS 410 for the UEs 110, among other things.

The memory 402 can also comprise contacts 404, which can include names, numbers, addresses, and other information about the user's business and personal acquaintances, among other things. In some examples, the memory 402 can also include a calendar 406, or other software, to enable the user to track appointments and calls, schedule meetings, and provide similar functions. In some examples, the memory 402 can also comprise navigation software 408 such as global positioning system (GPS) and/or cellular location based navigation systems. Of course, the memory 402 can also include other software such as, for example, e-mail, text messaging, social media, and utilities (e.g., calculators, clocks, compasses, etc.).

The memory 402 can also include the OS 410. Of course, the OS 410 varies depending on the manufacturer of the UE 110 and currently comprises, for example, iOS 10.3.2 for Apple products and Oreo for Android products. The OS 410 contains the modules and software that supports a computer's basic functions, such as scheduling tasks, executing applications, and controlling peripherals.

As mentioned above, the UE 110 can also include a video application 412 and a podcast application 414, among other things. The video application 412 can enable the UE 110 to download, store, and play live and prerecorded video, audio, and other content. Thus, the user may connect to the Internet or a cellular data network using the transceiver(s) 422 to download or stream content from the content servers 104, in some cases via the commodity server 102. Thus, in some case, the video application 412 can include a suitable graphical user interface (GUI), video playback capabilities including codecs and other information, and an audio component in communication with speakers on the UE 110, among other things.

In some examples, the UE 110 can also include a podcast application 414. The podcast application 414 can be similar to the video application, but can be tailored for downloaded and/or streaming podcasts and similar content. Thus, the podcast application 414 may include a different browser, or "podcatcher," and/or include bookmarks for podcast specific websites and providers (e.g., NPR, Soundcloud, etc.)

The UEs 110 may also include additional data storage devices (removable and/or non-removable) such as, for example, magnetic disks, optical disks, or tape. Such additional storage is illustrated in FIG. 4 by removable storage 418 and non-removable storage 420. The removable storage 418 and non-removable storage 420 can store some, or all, of the functions 404, 406, 408 and/or OS 410.

Non-transitory computer-readable media may include volatile and nonvolatile, removable and non-removable tangible, physical media implemented in technology for storage of information, such as computer readable instructions, data structures, program modules, or other data. The memory 402, removable storage 418, and non-removable storage 420 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UEs 110. Any such non-transitory computer-readable media may be part of the UEs 110 or may be a separate database, databank, remote server, or cloud-based server.

In some implementations, the transceiver(s) 422 include any sort of transceivers known in the art. In some examples, the transceiver(s) 422 can include wireless modem(s) to facilitate wireless connectivity with the other UEs, the Internet, and/or an intranet via a cellular connection. Further, the transceiver(s) 422 may include a radio transceiver that performs the function of transmitting and receiving radio frequency communications via an antenna (e.g., Wi-Fi or Bluetooth®). In other examples, the transceiver(s) 422 may include wired communication components, such as a wired modem or Ethernet port, for communicating with the other UEs or the provider's Internet-based network.

In some implementations, the output device(s) 424 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UEs 110 is connected to a network, the type of call being received (e.g., video calls vs. voice calls), the number of active calls, etc. Output device(s) 424 also include ports for one or more peripheral devices, such as headphones, peripheral speakers, or a peripheral display.

In various implementations, input device(s) 426 include any sort of input devices known in the art. For example, the input device(s) 426 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 5:
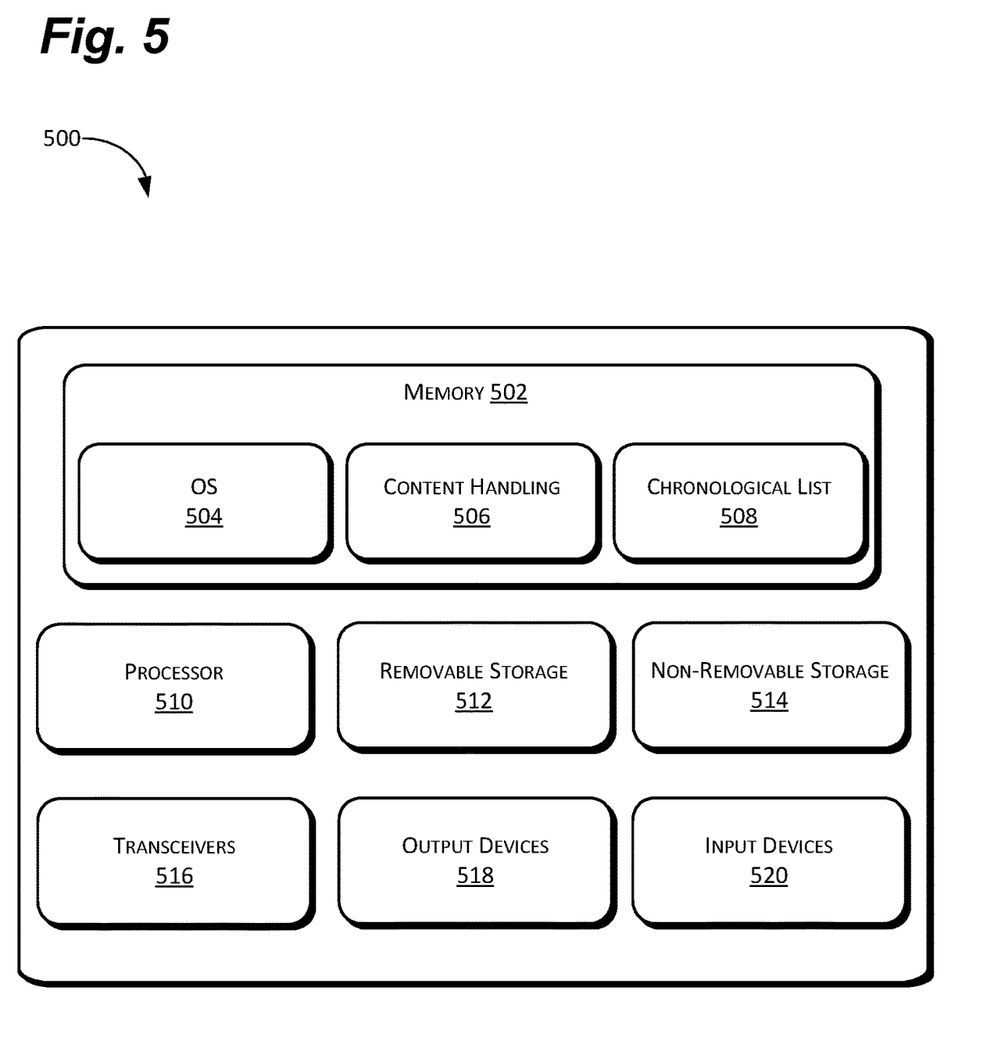
FIG. 5 is an example of a commodity server for use with the systems and methods disclosed herein, in accordance with some examples of the present disclosure.

As shown in FIG. 5, the system 100 and methods 200, 300 can also be used in conjunction with the commodity server 102, which can comprise a variety of electronic devices. As mentioned above, the commodity server 102 can comprise a supplementary server as part of the core network 108, or can be a standalone server for use with the system 100 and methods 200, 300 discussed herein.

The commodity server 102 can comprise a number of components to execute the above-mentioned functions and apps. As discussed below, the commodity server 102 can comprise memory 502 including many common features such as, for example, the OS 504, content handling algorithm 506, and one or more chronological lists 508 (of WBSs 106).

The commodity server 102 can also comprise one or more processors 510. In some implementations, the processor(s) 510 can be a central processing unit (CPU), a graphics processing unit (GPU), or both CPU and GPU, or any other sort of processing unit. The commodity server 102 can also include one or more of removable storage 512, non-removable storage 514, transceiver(s) 516, output device(s) 518, and input device(s) 520.

In various implementations, the memory 502 can be volatile (such as random access memory (RAM)), non-volatile (such as read only memory (ROM), flash memory, etc.), or some combination of the two. The memory 502 can include all, or part, of the functions 506, 508 for the commodity server 102, among other things. The memory 502 can also include the OS 504. Of course, the OS 504 varies depending on the manufacturer of the commodity server 102 and the type of component. Many servers, for example, run Linux or Windows Server. Dedicated cellular routing servers may run specific telecommunications OSs 504. The OS 504 contains the modules and software that supports a computer's basic functions, such as scheduling tasks, executing applications, and controlling peripherals.

In some examples, depending in the server's function, the commodity server 102 can also comprise a content handling algorithm 506. The content handling algorithm 506 can enable the commodity server 102 to receive the requests from the WBSs 106, compile the chronological list 508, and transmit the content to the WBSs 106. As mentioned above, the content handling algorithm 506 can enable the content to be sent to the WBSs 106 in descending order of network latency. In this manner, any buffer required at the WBS 106 is minimized because all WBSs 106 receive the content at substantially the same time.

The commodity server 102 may also include additional data storage devices (removable and/or non-removable) such as, for example, magnetic disks, optical disks, or tape. Such additional storage is illustrated in FIG. 5 by removable storage 512 and non-removable storage 514. The removable storage 512 and non-removable storage 514 can store some, or all, of the OS 504 and functions 506, 508.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the commodity server 102. Any such non-transitory computer-readable media may be part of the commodity server 102 or may be a separate database, databank, remote server, or cloud-based server.

In some implementations, the transceiver(s) 516 include any sort of transceivers known in the art. In some examples, the transceiver(s) 516 can include wireless modem(s) to facilitate wireless connectivity with the other UEs, the Internet, and/or an intranet via a cellular connection. Further, the transceiver(s) 516 may include a radio transceiver that performs the function of transmitting and receiving radio frequency communications via an antenna (e.g., Wi-Fi or Bluetooth®). In other examples, the transceiver(s) 516 may include wired communication components, such as a wired modem or Ethernet port, for communicating with the other UEs or the provider's Internet-based network.

In some implementations, the output device(s) 518 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the commodity server 102 is connected to a network, when requests are received from WBSs 106, etc. Output device(s) 518 also include ports for one or more peripheral devices, such as headphones, peripheral speakers, or a peripheral display.

In various implementations, input device(s) 520 include any sort of input devices known in the art. For example, the input device(s) 520 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 6:
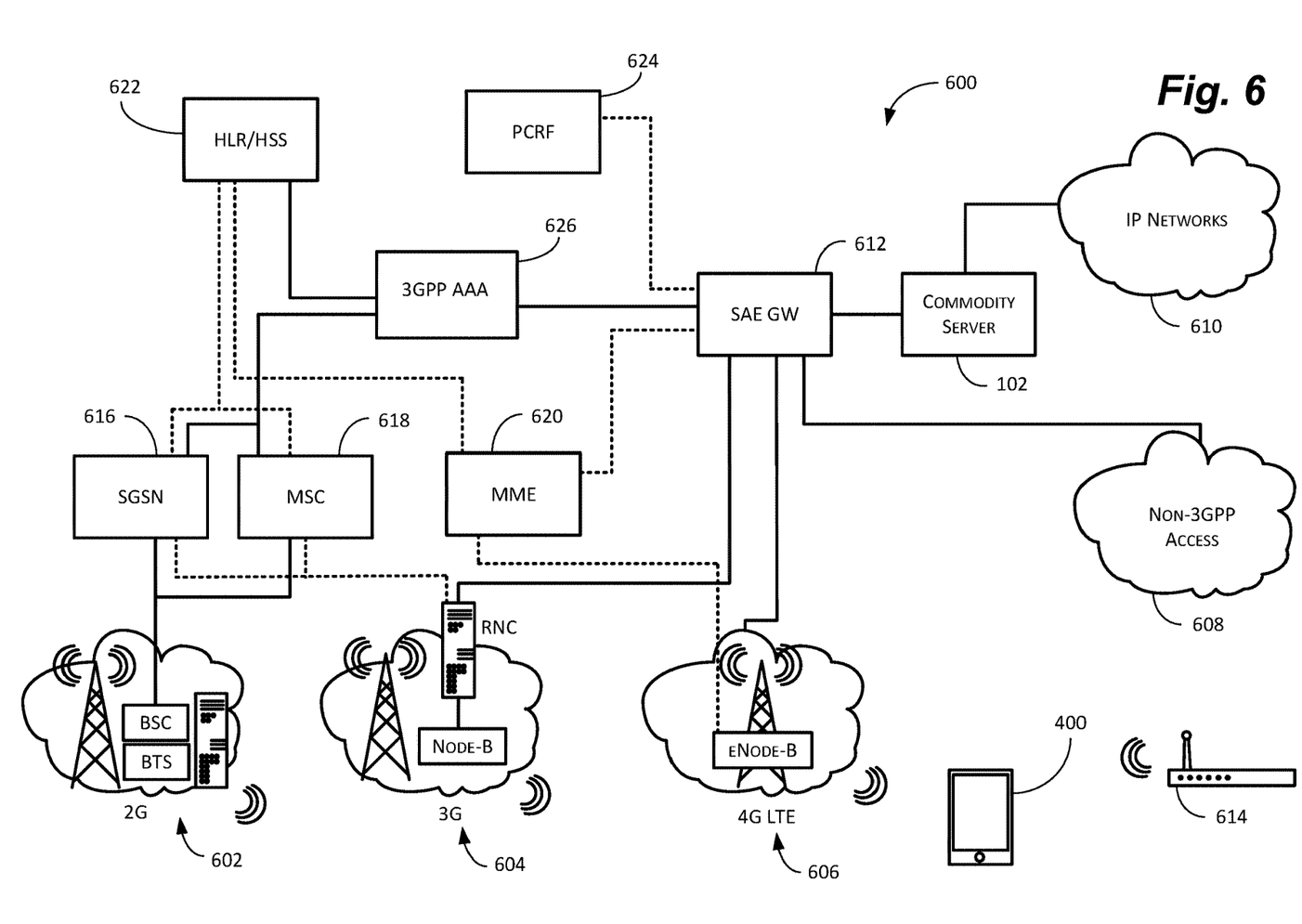
FIG. 6 is an example of a cellular and internet protocol network for use with the systems and methods disclosed herein, in accordance with some examples of the present disclosure.

FIG. 6 depicts a conventional cellular network 600 including 2G 602, 3G 604, and 4G long-term evolution (LTE) 606 components. Of course, future technologies, such as, for example, 5G, 6G, Internet of Things (IoT), and device-to-device (D2D) components could also be included and are contemplated herein. As mentioned above, many of the "back-end" components of the network 600 currently handle some, or all, of the replication and routing for content. Indeed, some, or all, of the aforementioned content handling algorithm 506 and chronological lists 508 could be located on one or more of, for example, the HLR/HSS 622, the 3GPP AAA server 626, or other components. In other words, the commodity server 102 can be standalone or can be integrated into one or more of the existing network components.

As is known in the art, data can be routed from the Internet or other sources using a circuit switched modem connection (or non-3GPP connection) 608, which provides relatively low data rates, or via packet switched IP networks 610 connections, which results is higher bandwidth. The LTE system 606, which is purely IP based, essentially "flattens" the architecture, with data going straight from the internet to the service architecture evolution gateway (SAE GW) 612 to evolved Node B transceivers 606, enabling higher throughput. Many UEs 110 also have wireless local area network (WLAN) 614 capabilities, in some cases enabling even higher throughput. In some cases, cellular carriers may use WLAN communications in addition to, or instead of, cellular communications to supplement bandwidth.

The serving GPRS support node (SGSN) 616 is a main component of the general packet radio service (GPRS) network, which handles all packet switched data within the network 600—e.g. the mobility management and authentication of the users. The MSC 618 essentially performs the same functions as the SGSN 616 for voice traffic. The MSC 618 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 618 sets up and releases the end-to-end connection, handles mobility and hand-over requirements during the call, and takes care of charging and real time pre-paid account monitoring.

Similarly, the mobility management entity (MME) 620 is the key control-node for the 4G LTE network 606. It is responsible for idle mode UE 110 paging and tagging procedures including retransmissions. The MME 620 is involved in the bearer activation/deactivation process and is also responsible for choosing the SAE GW 612 for the UE 110 at the initial attach and at time of intra-LTE handover involving Core Network (CN) node relocation (i.e., switching from one cell site to the next when traveling). The MME 620 is responsible for authenticating the user (by interacting with the HSS 622 discussed below). The Non-Access Stratum (NAS) signaling terminates at the MME 620 and it is also responsible for generation and allocation of temporary identities to UE 110. The MME 620 also checks the authorization of the UE 110 to camp on the service provider's HPLMN or VPLMN and enforces UE 110 roaming restrictions on the VPLMN. The MME 620 is the termination point in the network for ciphering/integrity protection for NAS signaling and handles the security key management. The MME 620 also provides the control plane function for mobility between LTE 606 and 2G 602/3G 604 access networks with the S3 interface terminating at the MME 620 from the SGSN 616. The MME 620 also terminates the S6a interface towards the home HSS 622 for roaming UEs 110.

The HSS/HLR 622 is a central database that contains user-related and subscription-related information. The functions of the HSS/HLR 622 include functionalities such as mobility management, call and session establishment support, user authentication and access authorization. The HSS, which is used for LTE connections, is based on the previous HLR and Authentication Center (AuC) from CGMA and GSM technologies, with each serving substantially the same functions for their respective networks.

The policy and charging rules unction (PCRF) 624 is a software node that determines policy rules in the network 600. The PCRF 624 is generally operates at the network core and accesses subscriber databases (e.g., the HSS/HLR 622) and other specialized functions, such as content handling (e.g., whether the user has sufficient data left in their plan), in a centralized manner. The PCRF 624 is the main part of the network 600 that aggregates information to and from the network 600 and other sources (e.g., IP networks 610). The PCRF 624 can support the creation of rules and then can automatically make policy decisions for each subscriber active on the network 600. The PCRF 624 can also be integrated with different platforms like billing, rating, charging, and subscriber database or can also be deployed as a standalone entity.

Finally, the 3GPP AAA server 626 performs authentication, authorization, and accounting (AAA) functions and may also act as an AAA proxy server. For WLAN 614 access to (3GPP) IP networks 610 the 3GPP AAA Server 626 provides authorization, policy enforcement, and routing information to various WLAN components. The 3GPP AAA Server 626 can generate and report charging/accounting information, performs offline charging control for the WLAN 614, and perform various protocol conversions when necessary.

As shown, in some examples, the 3GPP AAA server 626 can contain some, or all, of the components of the system 100. In some examples, the 3GPP AAA Server 626 can include, for example, the content handling algorithm 506 and the one or more chronological lists 508. Of course, as mentioned above, other components (e.g., the HSS/HLR 622) could also include some, or all, of the system 100.

As shown, in some examples, the commodity server 102 can be connected to one or more IP networks 610 to provide access to the content servers 104. The commodity server 102 can then be in communication with the core network 108 and ultimately the WBSs 106. In this examples, the commodity server 102 is shown "outside" the core network 108 and in communication with the SAE GW 612. As mentioned above, however, in some examples, the commodity server 102 can be "inside" the core network 108. In this configuration, the commodity server 102 can download content from the content servers 104, for example, which can be directly available to components of the core network 108.

While several possible examples are disclosed above, examples of the present disclosure are not so limited. For instance, while the systems and methods above are discussed with reference to use with cellular communications, the systems and methods can be used with other types of wired and wireless communications. In addition, while various functions are discussed as being performed on the commodity server 102 and/or various components on the cellular network 600, other components could perform the same or similar functions without departing from the spirit of the invention.

The specific configurations, connections, and network routing can be varied according to particular design specifications, network configurations, and/or constraints requiring a UE 110, commodity server 102, system 100, or method 200, 300 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   receiving, at a transceiver of a wireless base station (WBS), a plurality of requests from a plurality of user equipment (UEs) for content;
   sending, with the transceiver to a commodity server via a core network of a cellular communications network, a request to subscribe to the content, the request including at least one of a hyperlink or a session initiation protocol (SIP) message;
   receiving, at the transceiver, a transmission from the commodity server including:
      a first packet of data comprising a first portion of the content and a first timestamp; and
      a second packet of data comprising a second portion of the content and a second timestamp;
   reducing a buffer time associated with broadcasting at least one of the first portion of the content or the second portion of the content based at least in part on the first timestamp and the second timestamp;
   broadcasting, with the transceiver, the first portion of the content to the plurality of UEs at a first time provided in the first timestamp; and
   broadcasting, with the transceiver and subsequent to the first time, the second portion of the content to the plurality of UEs at a second time provided in the second timestamp;
   wherein the content is transmitted to the plurality of UEs simultaneously in a single broadcast via a broadcasting algorithm.

2. The method of claim 1, further comprising:
   receiving, at the transceiver, a request for the content from a single UE; and
   sending, from the transceiver to a content server, a request to download the content directly from the content server.

3. The method of claim 1, further comprising:
   receiving, at the transceiver, a termination request from each of the plurality of UEs; and
   sending, with the transceiver to the commodity server, a request to unsubscribe from the content.

4. The method of claim 1, wherein the transmission comprises a unicast transmission.

5. The method of claim 1, further comprising receiving a termination message subsequent to receiving at least one of the first portion of the content or the second portion of the content.

6. The method of claim 1, wherein at least one of the hyperlink or the SIP message specifies at least one of live streaming for a particular channel, a podcast, or a simulcast of a sporting event.

7. The method of claim 1, wherein the content includes a live broadcast event.

8. The method of claim 1, wherein the first time and the second time are sequential periods of time.

9. The method of claim 1, wherein the first time and the second time are periods of time that do not overlap.

10. The method of claim 1, wherein the content includes a podcast.

11. The method of claim 1, wherein the content includes a simulcast of a sporting event.

12. The method of claim 1, wherein the WBS is associated with at least one of a 4G LTE network or a 5G network.

13. The method of claim 1, further comprising:
   receiving a third packet of data comprising a third portion of the content and a third timestamp; and
   broadcasting, with the transceiver, the third portion of the content to the plurality of UEs at third first time provided in the third timestamp.

14. The method of claim 13, further comprising:
   receiving a fourth packet of data comprising a fourth portion of the content and a fourth timestamp; and
   broadcasting, with the transceiver, the fourth portion of the content to the plurality of UEs at fourth first time provided in the fourth timestamp.

15. A system comprising:
   a wireless base station (WBS) comprising:
      one or more transceivers to send and receive one or more wireless transmissions;
      memory storing a content-handling algorithm; and
      one or more processors in communication with at least the one or more transceivers and the memory, wherein the content-handling algorithm causes the one or more processors to perform operations comprising:
         receiving, at the one or more transceivers, a plurality of requests from a plurality of user equipment (UEs) for content, the request including at least one of a hyperlink or a session initiation protocol (SIP) message;
         sending, with the one or more transceivers to a commodity server via a core network of a cellular communications network, a request to subscribe to the content;
         receiving, at the one or more transceivers, a transmission from the commodity server including:
            a first packet of data comprising a first portion of the content and a first timestamp; and
            a second packet of data comprising a second portion of the content and a second timestamp;
         reducing a buffer time associated with broadcasting at least one of the first portion of the content or the second portion of the content based at least in part on the first timestamp and the second timestamp;
         broadcasting, with the one or more transceivers, the first portion of the content to the plurality of UEs at a first time provided in the first timestamp; and
         broadcasting, with the one or more transceivers and via a broadcasting algorithm subsequent to the first time, the second portion of the content to the plurality of UEs at a second time provided in the second timestamp.

16. The system of claim 15, further comprising:
receiving, at the one or more transceivers, a request for the content from a single UE; and
sending, from the one or more transceivers to a content server, a request to download the content directly from the content server.

17. The system of claim 15, further comprising:
receiving, at the one or more transceivers, a termination request from each of the plurality of UEs; and
sending, with the one or more transceivers to the commodity server, a request to unsubscribe from the content.

18. The system of claim 15, wherein the content is transmitted to the plurality of UEs simultaneously in a single broadcast.

19. A wireless base station (WBS) comprising:
one or more transceivers to send and receive one or more wireless transmissions;
memory storing a content-handling algorithm; and
one or more processors in communication with at least the one or more transceivers and the memory, wherein the content-handling algorithm causes the one or more processors to perform operations comprising:
receiving, at the one or more transceivers, a plurality of requests from a plurality of user equipment (UEs) for content;
sending, with the one or more transceivers to a commodity server via a core network of a cellular communications network, a request to subscribe to the content, the request including at least one of a hyperlink or a session initiation protocol (SIP) message;
receiving, at the one or more transceivers, a transmission from the commodity server including:
a first packet of data comprising a first portion of the content and a first timestamp; and
a second packet of data comprising a second portion of the content and a second timestamp;
reducing a buffer time associated with broadcasting at least one of the first portion of the content or the second portion of the content based at least in part on the first timestamp and the second timestamp;
broadcasting, with the one or more transceivers, the first portion of the content to the plurality of UEs at a first time provided in the first timestamp; and
broadcasting, with the one or more transceivers and subsequent to the first time, the second portion of the content to the plurality of UEs at a second time provided in the second timestamp,
wherein the content is transmitted to the plurality of UEs simultaneously in a single broadcast via a broadcasting algorithm.

20. The WBS of claim 19, the operations further comprising:
receiving, at the one or more transceivers, a request for the content from a single UE; and
sending, from the one or more transceivers to a content server, a request to download the content directly from the content server.

* * * * *